Jan. 22, 1963
L. G. S. WOOD
3,075,146
D.-C. VOLTAGE MEASURING APPARATUS
Filed Sept. 15, 1959
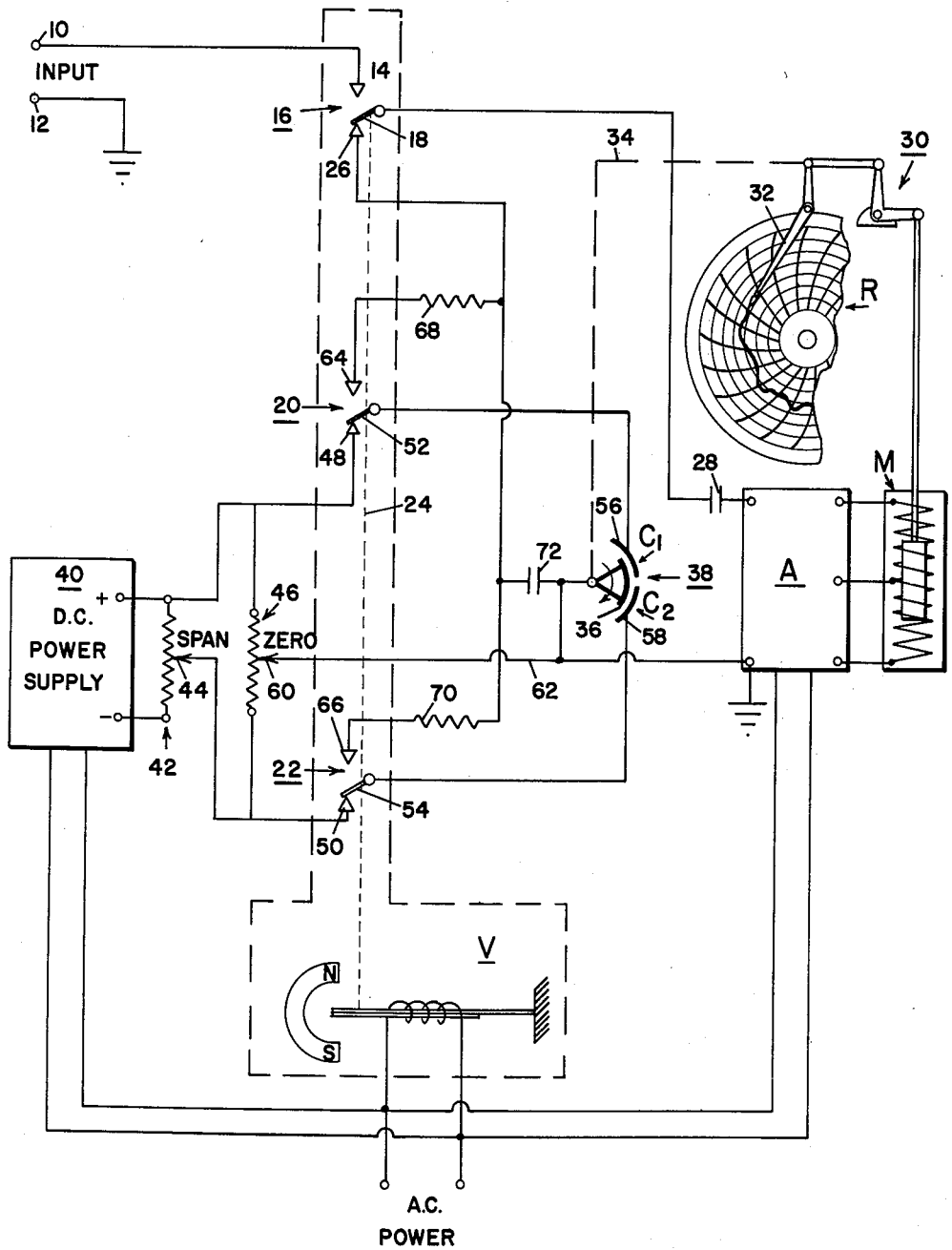
INVENTOR.
Leon G. S. Wood
BY
Curtis, Morris & Safford
ATTORNEYS United States Patent Office 3,075,146
Patented Jan. 22, 1963

3,075,146
D.-C. VOLTAGE MEASURING APPARATUS
Leon G. S. Wood, Wollaston, Mass., assignor to The Foxboro Company, Foxboro, Mass., a corporation of Massachusetts
Filed Sept. 15, 1959, Ser. No. 840,055
9 Claims. (Cl. 324—99)

This invention relates to voltage-measuring apparatus adapted to measure small D.-C. potentials. More in particular, this invention relates to improvements in voltage-measuring apparatus of the general class disclosed in U.S. Patent 2,596,955, issued to W. H. Howe on May 13, 1952.

The apparatus shown in the above-mentioned Howe patent operates on the principle of interconnecting a pair of capacitors with associated voltage sources, and then adjusting one of the capacitors to produce a predetermined relationship such that the value of the adjusted capacitor is a measure of the voltage being determined. Specifically, a fixed capacitor and a variable capacitor are first charged by switching them into a series circuit with the unknown voltage and a known voltage, and the net potential drop across the fixed capacitor and the unknown voltage is fed to the input of an amplifier. Then, the two capacitors are discharged by switching them together, in reverse-polarity sense, across the amplifier input. This switching cycle is repeated continuously and at a high rate of speed, e.g. 60 c.p.s., so that, if the charged potential across the fixed capacitor is different from the unknown voltage, an alternating signal is fed to the amplifier. By adjusting the variable capacitor, the charged potential across the fixed capacitor can be made equal to the unknown voltage, i.e. when no signal is fed to the amplifier, and the setting of the variable capacitor for this no-signal condition indicates the relationship between the known voltage and the unknown voltage.

Such an arrangement has been widely used for years, and has numerous practical advantages. In particular, the amplifier output can be used to operate a motor which automatically drives the variable capacitor to the balanced (no-signal) condition, so that the position of the motor shaft continuously represents the unknown voltage and hence can be used to control the pen of a chart-type recorder. Moreover, the use of a capacitor as the rebalanceable element provides a low-friction mechanism tending to assure excellent accuracy, and the disadvantages of conventional slide-wire rebalancing arrangements are avoided.

In commercial instruments constructed in accordance with the above Howe patent, the input impedance will normally be about 30 megohms. This is fully satisfactory for most applications, but is unsuited for measuring the potential of sources having extremely high internal resistance, e.g. potential sources such as the cells used to sense the pH of a liquid. In measuring the potential of such high-resistance sources, it is essential to avoid drawing any noticeable current from the source because the resulting internal voltage drop produces a corresponding error in the measurement. This problem is solved through the present invention, one aspect of which provides a capacitor-rebalance type of voltage-measuring apparatus having an input resistance of about 80,000 megohms. Further aspects of the present invention relate to novel capacitive means for developing an adjustable "balance voltage" to be compared with the known voltage, and for providing a linear relationship between the balance voltage and the capacitor adjustment.

Accordingly, it is an object of this invention to provide voltage-measuring apparatus that is superior to such apparatus used heretofore. Another object of this invention is to provide measuring apparatus of the variable-capacitor rebalance type, and having a very high input resistance so as effectively to avoid drawing any current from the source being measured. A still further object of this invention is to provide improved means for developing a balance voltage to be compared with an unknown input voltage. Other objects, aspects and advantages of the invention will be in part pointed out in, and in part apparent from, the following description considered together with the accompanying drawing which is a schematic diagram of one embodiment of the invention.

Referring now to the upper left-hand corner of the drawing, the unknown voltage to be measured is applied to a pair of input terminals 10 and 12, the lower one of which is grounded, e.g. connected to the instrument chassis (not shown). The upper terminal 10 conducts the input voltage to the upper contact 14 of a vibrating switch element 16 having a shiftable contact arm 18. Switch element 16 is ganged to two other similar switch elements 20 and 22 as indicated by broken line 24, and all three elements are driven by a switch vibrator V. This switch vibrator is identical to the corresponding unit described in the above-mentioned Howe patent, and hence will not be discussed in detail here. It may be noted, however, that the switch vibrator V drives all three switch elements 16, 20, 22 in synchronism at a relatively rapid rate, e.g. 60 c.p.s.

The lower contact 26 of switch element 16 is furnished, by means to be described hereinbelow, with a balance voltage that is automatically maintained equal to the unknown input voltage. When the contact arm 18 is driven down against contact 26, this balance voltage is connected to a coupling capacitor 28 in the input circuit of an amplifier A, so that this capacitor is charged up to a voltage equal to the input voltage. Thus, when the contact arm 18 is next shifted up to contact 14, effectively no current will be drawn from the source of unknown voltage, because coupling capacitor 28 already is charged up to the potential of the input voltage. Consequently, there will be essentially no internal voltage drop in the source being measured, and the voltage measurement will be accurate even when the source resistance is extremely high.

When the input voltage changes, the difference in potential between contacts 14 and 26 produces on contact arm 18 an alternating "comparison signal" which is fed through capacitor 28 to amplifier A. The output of this amplifier is connected, as described in the above Howe patent, to a positioning motor M which acts through a linkage 30 to reposition the pen 32 of an associated recorder R. At the same time, linkage 30 acts through another mechanical link, indicated by broken line 34, to rotate the common rotor 36 of a differential-capacitance device schematically indicated at 38. This differential device operates, in a manner now to be explained, to control the balance voltage applied to lower contact 26, and to vary this balance voltage until it is made equal to the new input voltage. When this has been accomplished, the alternating comparison signal fed to amplifier A again is reduced to zero, and the motor M and differential-capacitance device 38 stop in their new positions.

The means for developing the alance evoltage furnished to switch contact 26 includes a conventional regulated D.-C. power supply, shown in block outline at 40, having a potentiometer 42 connected across its output terminals. The voltage picked off by the movable arm 44 of this potentiometer is fed to the end terminals of a second potentiometer 46, and also is fed to the respective lower contacts 48 and 50 of switch elements 20 and 22. When the contact arms 52 and 54 of these switch elements are positioned as shown, the supply potential is connected across stators 56 and 58 of the differential capacitor 38. These stators serve, together with rotor 36, to establish two capacitors $C_1$ and $C_2$ the capacitances of which vary inversely as rotor 36 is rotated by link 34.

Potentiometer 46 serves as a voltage-divider to provide two separate potential supply circuits, the movable arm 60 of this potentiometer forming the common terminal for these two circuits. This movable arm 60 is connected by a lead 62 to the common rotor 36 of the differential-capacitance device 38, so that the voltages applied to capacitors $C_1$ and $C_2$ vary inversely as the potentiometer is adjusted. With power supply 40 polarized as indicated in the drawing, it will be apparent that capacitors $C_1$ and $C_2$ are reverse-polarized, i.e. stator 56 will be positive with respect to the rotor and stator 58 will be negative with respect to the rotor. If the voltages on $C_1$ and $C_2$ are equal (when potentiometer 46 is in mid-position), the charges on the capacitors will, of course, be directly proportional to the respective capacitance values, i.e. proportional to the positioning of rotor 36.

When contact arms 52 and 54 are shifted up to their respective contacts 64 and 66, capacitors $C_1$ and $C_2$ are connected, through current limiting resistors 68 and 70, in parallel with a fixed capacitor 72. Since capacitors $C_1$ and $C_2$ are reverse-polarized with respect to this fixed capacitor, the voltage across the latter will be proportional to the net difference in charge on capacitors $C_1$ and $C_2$, as well as inversely proportional to the sum of the capacitance values of $C_1$ and $C_2$. Because $C_1$ and $C_2$ vary differentially, the sum of their capacitance values will be constant regardless of the positioning of rotor 36, and thus the changes in voltage across fixed capacitor 72 will be proportional only to the changes in net charge on $C_1$ and $C_2$. And since the charges on $C_1$ and $C_2$ are directly proportional to the corresponding capacitance values of $C_1$ and $C_2$, the voltage across fixed capacitor 72 will be linearly related to the positioning of rotor 36.

On the next cycle of switch vibrator V, contact arms 52 and 54 are disconnected from fixed capacitor 72, and contact arm 18 is connected to this capacitor through its lower contact 26. Thus the balance voltage developed across capacitor 72 is fed to the coupling capacitor 28, the return path being through ground.

If the balance voltage on fixed capacitor 72 is equal to the input voltage applied to input terminals 10 and 12, the system is stabilized and no signal will be fed through capacitor 28 to amplifier A. Hence the pen 32 and differential capacitor 38 will remain stationary at a position corresponding to the magnitude of the input voltage being measured.

However, if the balance voltage on capacitor 72 is unequal to the input voltage, an alternating comparison signal will be fed through coupling capacitor 28 to amplifier A. The amplitude of this comparison signal will correspond to the difference between the magnitudes of the input and balance voltages, and the phase of the comparison signal will be determined by the polarity of this difference, i.e. whether the input voltage is smaller or larger than the balance voltage. The amplifier A includes the usual phase-sensitive circuitry which determines the relative energization of the two sections of the motor winding of motor M, and thereby controls the direction in which this motor moves pen 32 and the differential-capacitance device 38. If the input voltage is larger than the balance voltage, motor M will move in one direction, while if the input voltage is smaller the motor will move in the opposite direction. In either event, the rotor 36 of the differential-capacitance device 38 will be rotated in a direction to make the balance voltage equal to the input voltage.

For example, assume that the input voltage on upper contact 14 is more positive than the balance voltage on lower contact 26. The resulting comparison signal fed to amplifier A will move the armature of motor M down so as to shift pen 32 farther out radially along the chart of recorder R, and rotate rotor 36 counterclockwise to increase the capacitance of $C_1$ and decrease the capacitance of $C_2$. Thus, when contact arm 52 next engages contact 48, $C_1$ will receive a larger (positive) charge than before; and conversely when contact arm 54 next engages contact 50, $C_2$ will receive a smaller (negative) charge than before. As a result, when contact arms 52 and 54 subsequently engage their other contacts 64 and 66, the fixed capacitor 72 will receive a larger net positive charge than before, thereby making the balance voltage on this capacitor more nearly equal the input voltage. The voltage on capacitor 72 continues to increase in this manner until it is equal to the input voltage, at which time the motor M stops and the system again is stabilized with the pen 32 indicating the magnitude of the input voltage.

If the movable arm 60 of potentiometer 46 is shifted, there will be a corresponding inverse change in the charges placed on capacitors $C_1$ and $C_2$. This, in turn, will unbalance the system and cause the motor M to shift the pen 32 and the differential-capacitance device 38 until balanced conditions again have been achieved. Thus, potentiometer 46 controls the positioning of pen 32, and may be used as a "zero" adjustment for fixing the pen position at the desired point for zero input voltage.

Potentiometer 42 controls the magnitude of the D.-C. voltages applied to capacitors $C_1$ and $C_2$, so that the setting of this potentiometer determines how far the rotor 36 must be moved to obtain rebalance of the system after a change in input voltage. Consequently, the "span" of the instrument can readily be altered by this potentiometer to accommodate input voltages of various ranges.

It will be apparent from the above description that the present invention achieves the objects set forth herein, and provides D.-C. voltage-measuring apparatus that is superior to such apparatus provided heretofore. In particular, this apparatus has an extremely high input resistance in that its operation does not require that any noticeable amount of current be drawn from the source of potentials being measured. Moreover, the apparatus is simple in construction, reliable in operation, and readily accommodates adjustments of "zero" and "span" settings as required. It is desired to emphasize that the description herein is not intended to be exhaustive or necessarily limiting, but rather is for the purpose of illustrating one form of the invention. Therefore, various modifications may be made without departing from the scope of this invention as limited by the prior art.

I claim:

1. In D.C. voltage-measuring apparatus, the combination of: a D.-C. power supply, first and second capacitors to be energized by said power supply, first switch means arranged to periodically energize said two capacitors from said power supply, the voltage across said first capacitor being variable in response to changes in the capacity of said second capacitor; second switch means synchronized with said first switch means and including means to alternately sample (1) the voltage across said first capacitor and (2) an unknown voltage to be measured, and to produce a comparison signal corresponding to the difference between said two voltages; motor drive means operable in response to changes in said comparison signal, and means controlled by said motor drive means for altering the capacity of said second capacitor in a direction to make the voltage across said first capacitor equal to said unknown voltage.

2. In D.-C. voltage-measuring apparatus, the combination of: a D.-C. power supply, first and second capacitors to be energized by said power supply, first vibratory switch means including means to alternately connect said second capacitor to said power supply and then connect said two capacitors in parallel, the voltage across said first capacitor being variable in response to changes in the capacity of said second capacitor; second vibratory switch means synchronized with said first switch means and including means to alternately sample (1) the voltage across said first capacitor and (2) an unknown voltage to be measured, and to produce an alternating comparison signal having an amplitude corresponding to the potential difference between said voltages and a phase corresponding to the polarity of said potential difference; said second switch means being arranged to sample the voltage of said first capacitor while said first switch means connects said second capacitor to said power supply; motor drive means operable in response to changes in said comparison signal, and means controlled by said motor drive means for altering the capacity of said second capacitor in a direction to make the voltage across said first capacitor equal to said unknown voltage.

3. In D.-C. voltage-measuring apparatus, the combination of: D.-C. power supply means; first, second and third capacitors to be energized by said power supply means; first switch means arranged to alternately connect said second and third capacitors to said power supply means and then to connect all three of said capacitors in parallel, the voltage across said first capacitor being variable in response to changes in the capacity of said second and third capacitors; second switch means synchronized with said first switch means and including means to alternately sample (1) the voltage across said first capacitor and (2) an unknown voltage to be measured, and to produce a comparison signal corresponding to the difference between said two voltages; motor drive means operable in response to changes in said comparison signal, and means controlled by said motor drive means for altering the capacity of said second and third capacitors in a direction to make the voltage across said first capacitor equal to said unknown voltage.

4. Apparatus as claimed in claim 3, wherein said second and third capacitors comprise a differential capacitance device, the capacitances of said second and third capacitors being variable inversely in response to movement of said motor drive means.

5. Apparatus as claimed in claim 4, wherein said power supply means comprises a single D.-C. power supply having two potential supply circuits with a common terminal, one of said supply circuits providing a positive potential and the other of said supply circuits providing a negative potential; said first switch means being arranged to connect said second and third capacitors to said two supply circuits respectively and in reverse polarity sense whereby the voltage on said first capacitor is determined by the difference in charges on said second and third capacitors.

6. For use in a D.-C. voltage measuring system wherein an unknown voltage is compared with an adjustable balance voltage of known magnitude, apparatus for producing said adjustable balance voltage comprising differential capacitance means having first and second variable capacitors which vary inversely as said differential capacitance means is operated, a third capacitor to receive electrical charges from said first and second capacitors; energizing means comprising first and second potential supply circuits; and first and second switch means for said first and second capacitors respectively, said switch means including means to connect said first and second capacitors to said potential supply circuits respectively and then to connect said first and second capacitors to said third capacitor.

7. Apparatus as claimed in claim 6, wherein said potential supply circuits are reverse-polarized, whereby said third capacitor receives from said first and second capacitors a net charge corresponding to the difference in the charges placed on said first and second capacitors respectively.

8. Apparatus as claimed in claim 7, wherein said energizing means comprises a single D.-C. power supply, potentiometer means connected in shunt across the output of said D.-C. power supply and having a movable arm to provide an adjustable potential intermediate the potentials of the ends of said potentiometer means; one side of said first and second capacitors being maintained at the same potential and having a common terminal; first circuit means connecting the movable arm of said potentiometer means to said common terminal; and second circuit means connecting the ends of said potentiometer means to said first and second switch means respectively, whereby said first and second capacitors are energized by respective voltages the relative magnitude of which is determined by the setting of said potentiometer means.

9. Apparatus as claimed in claim 8, including second potentiometer means connected across the output of said D.-C. power supply to permit an adjustment of the magnitude of the voltage supplied to the ends of the first-mentioned potentiometer means.

References Cited in the file of this patent
UNITED STATES PATENTS

| | | |
|---|---|---|
| 2,596,955 | Howe | May 13, 1952 |
| 2,618,674 | Stanton | Nov. 18, 1952 |
| 2,628,994 | Goodman | Feb. 17, 1953 |
| 2,713,656 | Meadows | July 19, 1955 |
| 2,920,274 | Gustafsson | Jan. 5, 1960 |